(12) United States Patent
Chen

(10) Patent No.: US 6,746,155 B2
(45) Date of Patent: Jun. 8, 2004

(54) BEARING DEVICE

(75) Inventor: Chien-Jung Chen, Kaohsiung Hsien (TW)

(73) Assignee: Yen Sun Technology Corp. (TW)

( * ) Notice: Subject to any disclaimer, the term of this patent is extended or adjusted under 35 U.S.C. 154(b) by 0 days.

(21) Appl. No.: 09/971,624

(22) Filed: Oct. 9, 2001

(65) Prior Publication Data

US 2003/0068105 A1 Apr. 10, 2003

(51) Int. Cl.[7] .............................................. F16C 33/66
(52) U.S. Cl. ....................... 384/279; 384/291; 384/296
(58) Field of Search ................................ 384/279, 291, 384/292, 286, 296

(56) References Cited

U.S. PATENT DOCUMENTS 2,610,096 A * 9/1952 Mallory ...................... 384/279
5,073,037 A * 12/1991 Fujikawa et al. ........... 384/120

* cited by examiner

Primary Examiner—Lenard A. Footland
(74) Attorney, Agent, or Firm—Stites & Harbison PLLC; Marvin Petry

(57) ABSTRACT

The present invention relates to a bearing device including a body formed with an inner groove that does not communicate with the shaft hole of the body. Thus, when the rotation shaft is rotated, the lubricating oil may lubricate the rotation shaft, and may flow back to be stored in the inner groove after the rotation shaft stops rotating, thereby achieving the effect of recycling use. At the same time, the inner groove does not communicate with the inner shaft hole, such that when the rotation shaft is rotated, the lubricating oil contained in the inner groove will not be directly carried out of the body and will not sputter out of the body. Thus, the amount of loss of the lubricating oil may be reduced, thereby increasing the lifetime of the bearing device.

6 Claims, 3 Drawing Sheets

BEARING DEVICE

BACKGROUND OF THE INVENTION

1. Field of the Invention

The present invention relates to a bearing device, and more particularly to a bearing device which may achieve the effect of recycling use, may increase the lifetime thereof, and may save cost of fabrication.

2. Description of the Related Art

A conventional bearing device includes a bearing having an inner wall formed with an oil groove or oil storage groove for achieving a better oil storage and guide effect. A conventional bearing device in accordance with the prior art shown in FIG. 1 comprises a bearing 1 having an inner wall formed with an oil storage groove 10 for providing a lubricating effect during rotation of the rotation shaft 12. By the oil storage groove 10, the excessive lubricating oil released from the bearing 1 may be stored in the oil storage groove 10 temporarily without leakage, thereby increasing the lifetime of the bearing 1.

Thus, the excessive lubricating oil released from the bearing 1 may be stored in the oil storage groove 10 temporarily. However, during rotation of the rotation shaft 12, the lubricating oil stored in the oil storage groove 10 directly contacts the rotation shaft 12, whereby the lubricating oil stored in the oil storage groove 10 will be carried out of the bearing 1, so that the lubricating oil sputters outward. Thus, oil seals 14 may be mounted on top and bottom of the bearing 1, thereby preventing the lubricating oil stored in the oil storage groove 10 from sputtering outward. However, the cost of fabrication is greatly increased. In addition, the friction between the rotation shaft 12 and the oil seal 14 is increased, so that the rotation shaft 12 cannot be rotated conveniently.

SUMMARY OF THE INVENTION

The primary objective of the present invention is to provide a bearing device which may achieve the effect of recycling use, may increase the lifetime thereof, and needs not to additionally provide an oil seal on the outer portion of the body, thereby increasing the convenience of the rotation shaft during rotation, and thereby saving cost of fabrication.

In accordance with the present invention, there is provided a bearing device, including a body having an inner wall formed with an inner groove that does not communicate with the shaft hole of the body. Thus, when the rotation shaft is rotated, the lubricating oil released from the body may lubricate the rotation shaft, and may flow back to be stored in the inner groove after the rotation shaft stops rotating, thereby achieving the effect of recycling use. At the same time, the inner groove does not communicate with the inner shaft hole of the inner bearing. Therefore, when the rotation shaft is rotated, the lubricating oil contained in the inner groove will not be directly carried out of the body and will not sputter out of the body. Thus, the amount of loss of the lubricating oil may be reduced, thereby increasing the lifetime of the bearing device. Further, the lubricating oil of the bearing device of the present invention will not be directly carried out of the body by the rotation shaft and will not sputter out of the body, so that the bearing device of the present invention needs not to additionally provide an oil seal on the outer portion of the body, thereby saving cost of fabrication, and so that the friction produced during rotation of the rotation shaft is relatively reduced, thereby increasing the convenience of the rotation shaft during rotation.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
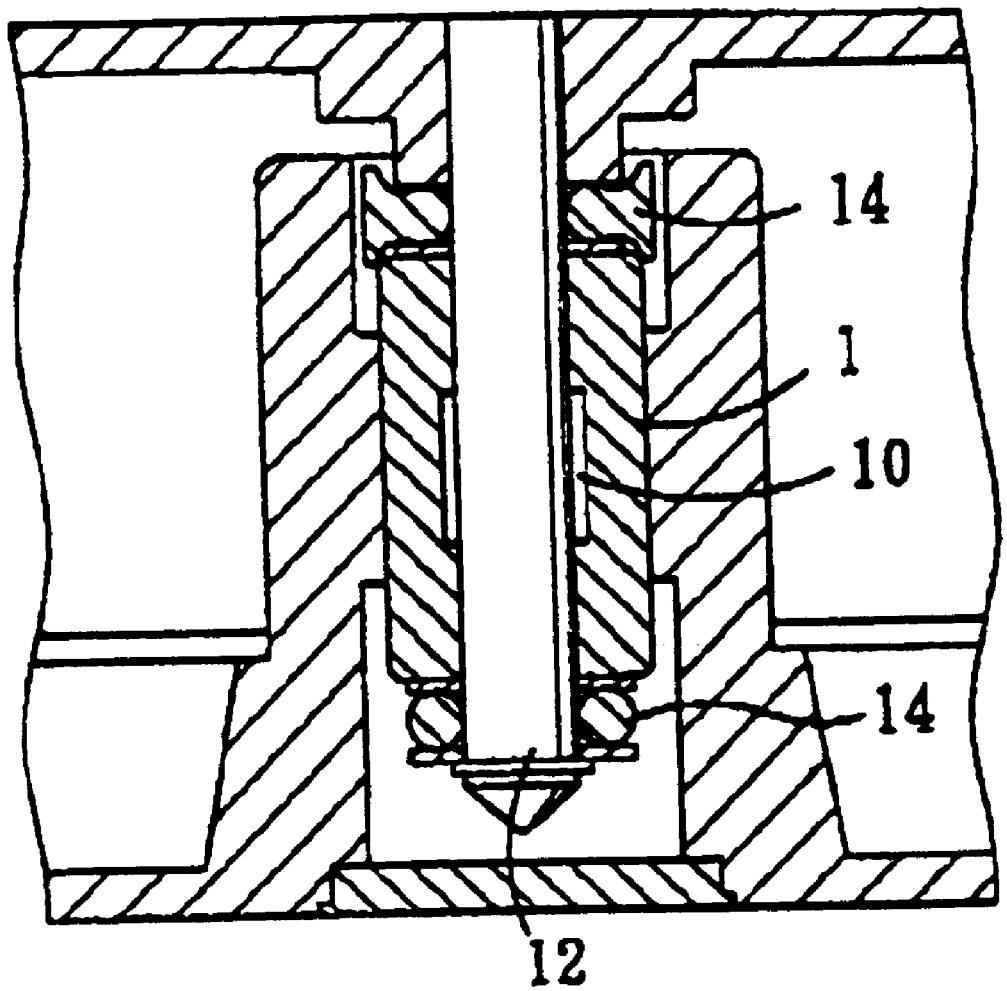
FIG. 1 is a partially cross-sectional assembly view of a conventional bearing device in accordance with the prior art.
Figure 2:
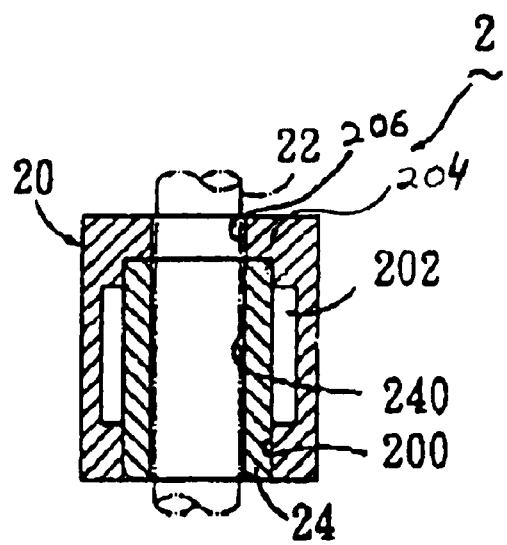
FIG. 2 is a cross-sectional assembly view of a bearing device in accordance with a first embodiment of the present invention.

Referring to the drawings and initially to FIG. 2, a bearing device 2 in accordance with a first embodiment of the present invention comprises a body 20 formed with a shaft hole 200 for passage of a rotation shaft 22 (as shown in phantom lines). The body 20 has an inner wall formed with an inner groove 202 and an end flange 204 forming an axial hole 206. The inner groove 202 is formed in an inner wall face of the shaft hole 200 of the body 20. An inner bearing 24 having an inner shaft hole 240 is received in the shaft hole 200 of the body 20 for closing the inner groove 202, so that the inner groove 202 does not communicate with the inner shaft hole 240 of the inner bearing 24.

As shown in FIG. 2, when the rotation shaft 22 is rotated in the inner shaft hole 240 of the inner bearing 24, the lubricating oil contained in an inner portion of the body 20 and an inner portion of the inner bearing 24 will be released during rotation of the rotation shaft 22, so as to lubricate the rotation shaft 22. When the rotation shaft 22 stops rotating, the lubricating oil contained in the inner portion of the body 20 and the inner portion of the inner bearing 24 will flow back and may be stored in the inner groove 202, so that when the rotation shaft 22 is rotated again, the lubricating oil contained in the inner groove 202 may be used to lubricate the rotation shaft 22, thereby achieving the effect of recycling use. At the same time, the inner groove 202 does not communicate with the inner shaft hole 240 of the inner bearing 24. Thus, the rotation shaft 22 will not directly contact the lubricating oil contained in the inner groove 202. In addition, when the rotation shaft 22 is rotated, the lubricating oil contained in the inner groove 202 will not be drawn to the rotation shaft 22 directly. The lubricating oil contained in the inner portion of the body 20, the inner portion of the inner bearing 24, and the inner groove 202 may flow to the rotation shaft 22 according to the amount of lubricating oil that is required during rotation, so that the lubricating oil contained in the inner groove 202 will not be directly carried out of the body 20 and will not sputter out of the body 20. Thus, the amount of loss of the lubricating oil may be reduced, thereby increasing the lifetime of the bearing device 20. Further, the lubricating oil of the bearing device 2 of the present invention will not be directly carried out of the body 20 by the rotation shaft 22 and will not sputter out of the body 20, so that the bearing device 2 of the present invention needs not to additionally provide an oil seal on the outer portion of the body 20, thereby saving cost of fabrication, and so that the friction produced during rotation of the rotation shaft 22 is relatively reduced, thereby increasing the convenience of the rotation shaft 22 during rotation.

Figure 3:
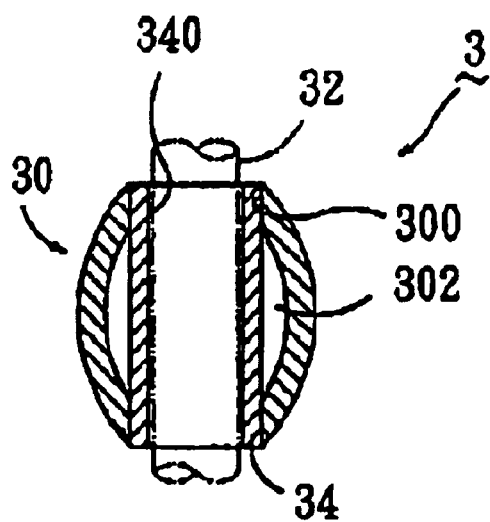
FIG. 3 is a cross-sectional assembly view of a bearing device in accordance with a second embodiment of the present invention.

Referring to FIG. 3, a bearing device 3 in accordance with a second embodiment of the present invention is substantially similar to the bearing device 2 in accordance with the first embodiment of the present invention. The difference is in that the body 30 is ball-shaped, and has a shaft hole 300 whose inner wall is formed with an arc-shaped inner groove 302. Thus, when the rotation shaft 32 is rotated in the inner shaft hole 340 of the inner bearing 34, the lubricating oil contained in an inner portion of the body 30 and an inner portion of the inner bearing 34 will be released during rotation of the rotation shaft 32, so as to lubricate the rotation shaft 32. When the rotation shaft 32 stops rotating, the lubricating oil contained in the inner portion of the body 30 and the inner portion of the inner bearing 34 will flow back and may be stored in the inner groove 302, so that when the rotation shaft 22 is rotated again, the lubricating oil contained in the inner groove 302 may be used to lubricate the rotation shaft 32, thereby achieving the effect of recycling use.

Figure 4:
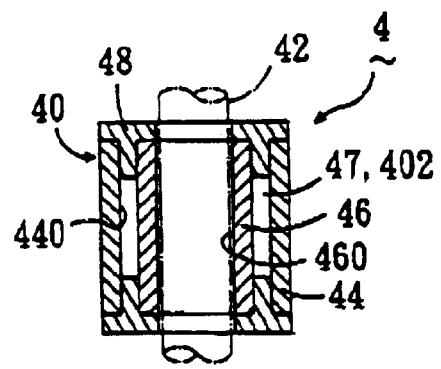
FIG. 4 is a cross-sectional assembly view of a bearing device in accordance with a third embodiment of the present invention.

Referring to FIG. 4, a bearing device 4 in accordance with a third embodiment of the present invention comprises a body 40 including a first bearing 44, and a second bearing 46 mounted in a shaft hole 440 of the first bearing 44. A clearance 47 is defined between the first bearing 44 and the second bearing 46. Seal members 48 are inserted into the clearance 47 in the top edge and bottom edge of the first bearing 44 and the second bearing 46, so that the clearance 47 may form an inner groove 402 that does not communicate with the shaft hole 460 of the second bearing 46. Thus, when the rotation shaft 42 is rotated in the shaft hole 460 of the second bearing 46, the lubricating oil contained in an inner portion of the first bearing 44 and an inner portion of the second bearing 46 will be released during rotation of the rotation shaft 42, so as to lubricate the rotation shaft 42. When the rotation shaft 42 stops rotating, the lubricating oil will flow back and may be stored in the inner groove 402, thereby achieving the effect of recycling use.

Figure 5:
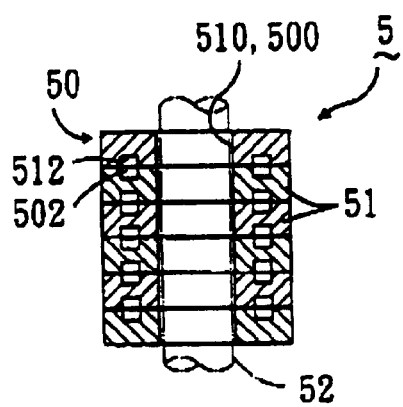
FIG. 5 is a cross-sectional assembly view of a bearing device in accordance with a fourth embodiment of the present invention.

Referring to FIG. 5, a bearing device 5 in accordance with a fourth embodiment of the present invention comprises a body 50. The body 50 is formed by multiple annular plates 51 having openings 510 stacked together, thereby forming a shaft hole 500. Each of the annular plates 51 has contact faces recessed with recesses 512. Thus, when the multiple annular plates 51 are stacked to form the body 50, the recesses 512 may form inner grooves 502 that do not communicate with the shaft hole 500 of the body 50. Thus, when the rotation shaft 52 is rotated in the shaft hole 500 of the body 50, the lubricating oil will be released during rotation of the rotation shaft 52, so as to lubricate the rotation shaft 52. When the rotation shaft 52 stops rotating, the lubricating oil will flow back and may be stored in the inner groove 502, thereby achieving the effect of recycling use.

Figure 6:
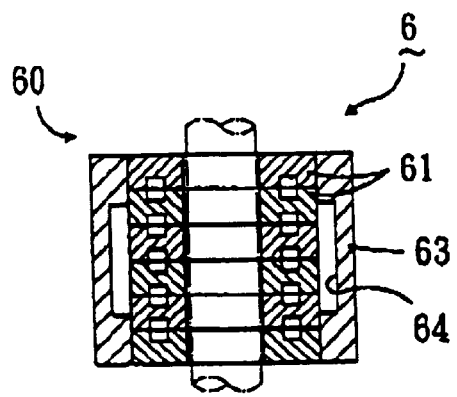
FIG. 6 is a cross-sectional assembly view of a bearing device in accordance with a fifth embodiment of the present invention.

Referring to FIG. 6, a bearing device 6 in accordance with a fifth embodiment of the present invention is substantially similar to the bearing device 5 in accordance with the fourth embodiment of the present invention. The difference is in that, a bushing 63 is mounted on an outer wall face of the body 60 that is formed by the stacked annular plates 61, and an annular oil storage groove 64 is formed in the inner wall face of the bushing 63. When the rotation shaft 62 stops rotating, the lubricating oil may be stored in the oil storage groove 64. Thus, the oil storage groove 64 may provide another storage space for the lubricating oil, thereby increasing the lubricating oil storage amount of the bearing device 6, and thereby increasing the lifetime of the bearing device 6.

Accordingly, in accordance with the bearing device of the present invention, the body has an inner wall formed with an inner groove that does not communicate with the shaft hole of the body. Thus, when the rotation shaft is rotated, the lubricating oil released from the body may lubricate the rotation shaft, and may flow back to be stored in the inner groove after the rotation shaft stops rotating, thereby achieving the effect of recycling use. At the same time, the inner groove does not communicate with the inner shaft hole of the inner bearing. Therefore, when the rotation shaft is rotated, the lubricating oil contained in the inner groove will not be directly carried out of the body and will not sputter out of the body. Thus, the amount of loss of the lubricating oil may be reduced, thereby increasing the lifetime of the bearing device. Further, the lubricating oil of the bearing device of the present invention will not be directly carried out of the body by the rotation shaft and will not sputter out of the body, so that the bearing device of the present invention needs not to additionally provide an oil seal on the outer portion of the body, thereby saving cost of fabrication, and so that the friction produced during rotation of the rotation shaft is relatively reduced, thereby increasing the convenience of the rotation shaft during rotation.

In conclusion, the bearing device in accordance with the present invention may achieve the effect of recycling use, may increase the lifetime thereof, and needs not to additionally provide an oil seal on the outer portion of the body, thereby increasing the convenience of the rotation shaft during rotation, and thereby saving cost of fabrication.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A bearing device for a shaft, said bearing device comprising:
  a body having a shaft hole with an annular inner groove and an end flange, the end flange forming an axial hole; and
  a porous inner bearing, disposed in the shaft hole to insulate the inner groove, the inner bearing having an inner bearing end corner adapted to engage with the end flange where the end flange radially extends past the inner bearing end corner;
  wherein a shaft can extend through the shaft hole of the inner bearing and the axial hole of the body successively when operating.

2. The bearing device of claim 1, wherein the shaft hole of the porous inner bearing comprises a radial inner surface coaxially aligned with that of the axial hole of the body, thereby the radial inner surfaces of the shaft hole and the axial hole commonly supporting the shaft for stable operation.

3. The bearing device as claimed in claim 1, wherein the body includes a second bearing mounted in the shaft hole of the porous inner bearing, a clearance is defined between the inner bearing and the second bearing, seal members are inserted into the clearance in top edge and bottom edge of the inner bearing and the second bearing, so that the clearance forms the inner groove that does not communicate with the shaft hole of the second bearing.

4. The bearing device as claimed in claim 1, wherein the body is formed by multiple annular plates having openings stacked together, thereby forming the shaft hole, and each of the annular plates has contact faces recesses with recesses, such that the recesses may form inner grooves that do not communicate with the shaft hole of the body.

5. The bearing device as claimed in claim 4, further comprising a bushing mounted on an outer wall face of the body, and an annular oil storage groove formed in an inner wall face of the bushing.

6. The bearing device as claimed in claim 1, wherein the body is ball-shaped, and the inner groove formed in the inner wall of the shaft hole is arc-shaped.

\* \* \* \* \*